United States Patent [19]

Park

[11] Patent Number: 5,390,249
[45] Date of Patent: Feb. 14, 1995

[54] RECEIVER DEVICE FOR RECEIVING RINGING SIGNALS IN AN OFF-HOOK LINE CONDITION

[76] Inventor: Chung H. Park, 443-52, Burn 1-dong, Dobong-gu, Seoul, Rep. of Korea

[21] Appl. No.: 820,034

[22] Filed: Jan. 14, 1992

[30] Foreign Application Priority Data

Mar. 14, 1991 [KR] Rep. of Korea ............... 3388/1991

[51] Int. Cl.⁶ .................................. H04M 1/74
[52] U.S. Cl. .................... 379/393; 379/377; 379/386; 379/387
[58] Field of Search ............. 379/387, 393, 377, 386

[56] References Cited

U.S. PATENT DOCUMENTS 4,903,291  2/1990  Tsurufuji et al. ............ 379/389
4,922,529  5/1990  Kiel ........................... 379/377

Primary Examiner—James L. Dwyer
Assistant Examiner—M. Shehata
Attorney, Agent, or Firm—Finnegan, Henderson, Farabow, Garrett & Dunner

[57] ABSTRACT

A telephone communication enable state maintaining circuit is disclosed, and the circuit includes a communication circuit 10, a communication operating circuit 20 and an operation maintaining circuit 30. The communication circuit 10 includes contacts 3,4,5, and a condenser $C_1$. The communication operating circuit 20 includes a resistor $r_1$, a condenser $C_2$, a transistor 6 and contacts $R_{3a}$, $R_{3b}$, $R_{1a}$, $R_{1b}$. The operation maintaining circuit 30 includes contacts $R_{1c}$, $R_{3c}$, a resistor $r_2$, a condenser $C_3$, and a transistor 7. According to the present invention, telephone calls from the outside can be received, even if the telephone receiver is placed in an abnormal manner.

3 Claims, 1 Drawing Sheet

RECEIVER DEVICE FOR RECEIVING RINGING SIGNALS IN AN OFF-HOOK LINE CONDITION

FIELD OF THE INVENTION

The present invention relates to a communication enable state maintaining circuit for use in telephones, in which communications become possible regardless of the placement of the telephone receiver.

BACKGROUND OF THE INVENTION

In the conventional telephones in which hook switches are provided, if the telephone receiver is placed at a position other than the normal position, then telephone calls from the outside may not be received and the user can use the telephone only after pushing the hook switch, thereby imposing inconveniences.

Furthermore, if the telephone receiver is placed at a position other than the normal position, the load of the switching system at the telephone bureau is increased.

SUMMARY OF THE INVENTION

Therefore it is an object of the present invention to provide a communication enable state maintaining circuit for use in telephones, in which the disabled states of telephones due to the abnormal placement of receivers can be overcome by adding a circuit to the existing telephones or to new kinds of telephones.

It is another object of the present invention to provide a communication enable state maintaining circuit by which the increase of busy lines due to the abnormal placements of telephone receivers can be reduced.

It is still another object of the present invention to provide a communication enable state maintaining circuit by which telephone disorder reports can be reduced so as the telephone bureau to concentrate on other important operations.

BRIEF DESCRIPTION OF THE DRAWINGS

The above objects and other advantages of the present invention will become more apparent by describing in detail the preferred embodiment of the present invention with reference to the attached drawing in which.

DESCRIPTION OF THE PREFERRED EMBODIMENT

Figure 1:
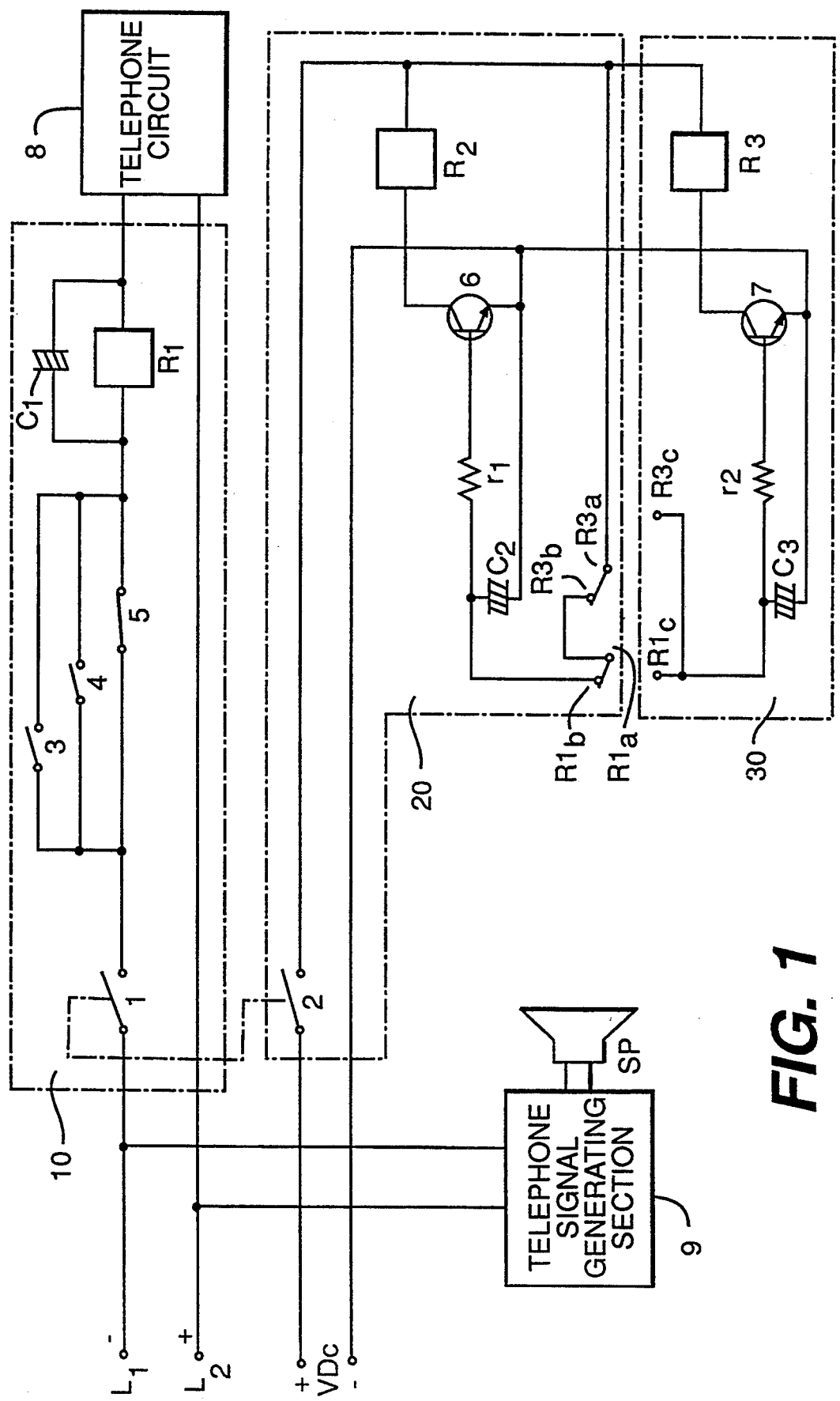
FIG. 1 illustrates the circuit of the communication enable state maintaining circuit for use in telephones according to the present invention.

A push button switch or hook switch 1 and a telephone signal generating section 9 are connected to telephone lead lines $L_1$, $L_2$, while, as shown in FIG. 1, a contact 3 of a relay $R_1$, a contact 4 of a relay $R_2$, and a contact 5 of a relay $R_3$ are connected in parallel to the parallel combination of the relay $R_1$ and condenser $C_1$ between the hook switch 1 and a telephone circuit 8, thereby forming a communication circuit 10.

A circuit operating switch or operating hook switch 2 which is interlocked with the push button switch or hook switch 1, so that both switches are operated together, is connected to the positive line of a circuit operating line VDC. The relay $R_2$ and the relay $R_3$ are connected to each other, and, between the relays $R_2$ and $R_3$, a contact $R_{3a}$ of the relay $R_3$ is connected, so that, when it contacts with a contact $R_{3b}$ of the relay $R_3$, a contact $R_{1a}$ of the relay $R_1$ and a contact $R_{1b}$ of the relay $R_1$ are connected through a resistor $r_1$ and through a condenser $C_2$ to the negative line of a circuit operating line VDC and the collector of transistor 6 to the base of a transistor 6. Relay $R_2$ is operated in accordance with the operation of the transistor 6, thereby forming a communication operating circuit 20. The communication enable state maintaining circuit of the present invention includes the communication circuit section 10, and the communication operating circuit 20 as described above, and further includes an operation maintaining circuit 30, This operation maintaining circuit 30 is constituted such that, upon connecting a contact $R_{3a}$ of the relay $R_3$ to a contact $R_{3c}$ of the relay $R_3$, the contact $R_{1a}$ of the relay $R_1$ is connected to a contact $R_{1c}$ of the relay $R_1$, so that it is connected through a resistor $r_2$ to the base of a transistor 7, and through a condenser $C_3$ to the collector of transistor 7 and the negative line of a circuit operating line VDC. The relay $R_3$ is operated in accordance with the operation of the transistor 7.

The circuit of the present invention constituted as above will now be described as to its operation and effects. If the push button switch or hook switch 1 is activated by picking up the receiver., then the communication circuit is connected, and, at the same time, the circuit activating switch or the operation hook switch 2 which is interlocked with the communication switch is also activated, so that it should be connected to the circuit operating line, and that a dc power should be supplied to the communication circuit 10, the communication operating circuit 20 and the maintaining circuit 30.

Under this condition, the current which flows through the telephone lead line $L_1$, is supplied through the contact 5 of the relay $R_3$ to the relay $R_1$. Meanwhile, the current which flows through the communication operating circuit 20 passes through the contact $R_{3a}$ of the relay $R_3$, the contact $R_{3b}$ of the relay $R_3$, the contact $R_{1a}$ of the relay $R_1$, the contact $R_{1b}$ of the relay $R_1$, and the resistor $r_1$ in the cited order, before being inputted into the base of the transistor 6 ultimately. Thus if the transistor 6 is turned on for about 0.2 seconds by the condenser $C_2$, the relay $R_2$ is also operated for 0.2 seconds. Consequently, the contact 4 of the relay $R_2$ of the communication circuit section 10 is connected so as to activate the relay $R_1$, and therefore, the contact 3 of the relay $R_1$ is maintained in the connected state until the communication is completed, while the contact 5 of the relay $R_2$ is restored to the original position.

Once the communication circuit is formed by the operation of the relay $R_1$, the contact $R_{1a}$ of the relay $R_1$ is connected to the contact $R_{1c}$ of the relay $R_1$, and the electric current flows through the resistor $r_2$ to the base of the transistor 7. As a result, the transistor 7 is turned on activating relay $R_3$ and consequently, the contact 5 of the relay $R_3$ of the communication circuit section 10 is turned off. At the same time, the contact $R_{3a}$ of the relay $R_3$ is connected to the contact $R_{3c}$ of the relay $R_3$, and therefore, the communication operating circuit 20 is de-activated, while the operation maintaining circuit 30 is activated. Consequently, the contact 5 of the relay $R_3$ is disconnected until the telephone communication is completed and the normal state is restored.

Accordingly, when the user of the telephone hungs up the received to the hook switch, all the operations are terminated by the disconnecting function of the hook switches so that a next communication should be ready. However, if the receiver departs from the normal position inadvertently, the electronic switching system of the telephone bureau carries out a line parking on the line of the relevant subscriber in accordance with the program of the computer installed at the telephone bureau. Therefore, the relay $R_1$ is de-activated, and the disconnecting circuit of the communication circuit is also deactivated, so that the contact 3 of the relay $R_1$ should be restored, thereby disconnecting the communicating path.

Thus, in terminating the operation after the disconnection of the communication current, the operation maintaining circuit disconnects the communication circuit placing it in a ready state. Therefore, telephone calls from the outside can be received and communications can be performed, as if the telephone receiver is positioned at the normal position.

Therefore, even when the telephone receiver is not in normal position, the line $L_1$ of the communication circuit is not connected owing to the continuous operation of the operation maintaining circuit 30, with the result that a loop circuit is not formed, but the telephone functions as if the receiver is positioned at the normal state.

According to the present invention as described above, even when the telephone receiver is wrongly placed, the inconvenience is overcome, and rush of telephone disorder reports can be avoided, as well as eliminating the case of occupying a line by a wrongly placed telephone, thereby improving the operations of the whole telephone communicating system.

What is claimed is:

1. A telephone communication circuit comprising:
   a first communication circuit (10) comprising:
   a first hook switch (1) connected to a first telephone lead line,
   a second hook switch (2) connected to said first hook switch (1), and connected to a positive line of a circuit operating line VDC, wherein said first hook switch and said second hook switch are operated in the same manner,
   a first switch (3) of a first relay ($R_1$),
   a first switch (4) of a second relay ($R_2$),
   a first switch (5) of a third relay ($R_3$), wherein said first switches of said first, second, and third relays are connected in parallel between said first hook switch (1) and a parallel connection of said first relay and a first condenser, said parallel connection connected between said first switches of said first, second, and third relays and a telephone circuit;
   a communication operating circuit (20) comprising:
   a first side of said first relay and a first side of said second relay ($R_2$ and $R_3$) connected to said positive line of a circuit operating line VDC,
   a first contact of a second switch ($R_3a$) of said third relay ($R_3$) connected to said positive line of said circuit operating line VDC, said second relay, and said third relay ($R_2$ and $R_3$);
   a second contact of said second switch ($R_3b$) of said third relay ($R_3$) connected to a first contact of a second switch ($R_1a$) of said first relay ($R_1$); and
   a second contact of said second switch ($R_1b$) of said first relay ($R_1$) for being electrically connected to said first contact of said second switch ($R_3a$) of said third relay such that when said first and second relays are not operated, a circuit is completed between said positive line of said circuit operating line VDC, said first contact of said second switch of said first relay being connected to a base of a first transistor through a first resistor and through a first condenser to a collector of said first transistor and a negative line of said circuit operating line VDC, said first transistor operating said relay $R_2$; and
   an operation maintaining circuit 30 comprising:
   a third contact of said second switch of said third relay,
   a third contact of said second switch of said first relay connected to said third contact said second switch of said third relay and to a base of a second transistor through a second resistor and through a second condenser to a collector of said second transistor and said negative line of said operating VDC, such that when said third relay is operated a circuit is made from said positive line of said circuit operating line VDC to said third contact of said second switch of said third relay and when said first relay is operated, said first contact of said second switch of said first relay is connected to said third contact of said second switch of said first relay.

2. The telephone communication enable state maintaining circuit as claimed in claim 1, wherein push button switches 1 and 2 are used in place of said hook switches 1 and 2.

3. A telephone communication circuit comprising:
   a communication circuit connected to a first telephone lead line though a first hook switch including a first, a second, and a third switch connected in parallel, the parallel connection connected in series with a first relay to a telephone circuit such that when the first hook switch is operated, the first telephone lead line is connected to the telephone circuit through the third switch and the first relay and when the first relay is operated, the first switch is closed and when a line parking signal has been received by the communication circuit from a telephone bureau that stops a current flowing through the first relay and the first hook switch is not opened, the first relay causes the first switch to open thereby breaking the connection from the first telephone lead line to the telephone circuit;
   a communication operating circuit including a second hook switch, operated together with the first hook switch, and a second relay such that when the second hook switch is operated, the second relay is operated to close the second switch to maintain a connection between the first telephone lead line and the telephone circuit;
   an operation maintaining circuit including a third relay such that when the second hook switch is operated, the third relay causes the third switch to open; and
   a telephone signal generating section connected to a first and a second telephone lead line.

* * * * *

UNITED STATES PATENT AND TRADEMARK OFFICE
CERTIFICATE OF CORRECTION

PATENT NO. : 5,390,249
DATED : February 14, 1995
INVENTOR(S) : CHUNG HA PARK

It is certified that error appears in the above-indentified patent and that said Letters Patent is hereby corrected as shown below:

Claim 1, Column 4, line 11 change "30" to --(30)--.

Signed and Sealed this

Twenty-third Day of May, 1995

Attest:

BRUCE LEHMAN

Attesting Officer     Commissioner of Patents and Trademarks